United States Patent
Sheedy et al.

(10) Patent No.: US 10,562,825 B2
(45) Date of Patent: Feb. 18, 2020

(54) METHOD FOR FABRICATING A CERAMIC MATERIAL

(71) Applicant: United Technologies Corporation, Farmington, CT (US)

(72) Inventors: Paul Sheedy, Vernon, CT (US); Wayde R. Schmidt, Pomfret Center, CT (US); Tania Bhatia Kashyap, West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 131 days.

(21) Appl. No.: 15/618,874

(22) Filed: Jun. 9, 2017

(65) Prior Publication Data

US 2017/0275211 A1 Sep. 28, 2017

Related U.S. Application Data

(60) Division of application No. 13/859,093, filed on Apr. 9, 2013, now Pat. No. 9,701,591, which is a
(Continued)

(51) Int. Cl.
C04B 41/00 (2006.01)
C04B 41/81 (2006.01)
(Continued)

(52) U.S. Cl.
CPC ............ *C04B 41/81* (2013.01); *C04B 35/571* (2013.01); *C04B 35/589* (2013.01); *C04B 35/6269* (2013.01); *C04B 35/62842* (2013.01); *C04B 35/62844* (2013.01); *C04B 35/76* (2013.01); *C04B 35/806* (2013.01); *C04B 41/85* (2013.01);
(Continued)

(58) Field of Classification Search
CPC ...................................................... C04B 41/81
See application file for complete search history.

(56) References Cited

U.S. PATENT DOCUMENTS 5,206,327 A * 4/1993 Matsumoto ............ C08G 77/62
528/4
5,407,119 A 4/1995 Churchill et al.
(Continued)

FOREIGN PATENT DOCUMENTS

| | | |
|---|---|---|
| EP | 2581356 | 4/2013 |
| EP | 2617694 | 7/2013 |
| WO | 2012002912 | 1/2012 |

OTHER PUBLICATIONS

Griel, "Active-Filler-Controlled Pyrolysis of Preceramic Polymers," 1995, J. Am. Ceram. Soc. 78, pp. 835-848. (Year: 1995).*
(Continued)

*Primary Examiner* — Robert A Vetere
(74) *Attorney, Agent, or Firm* — Carlson, Gaskey & Olds, P.C.

(57) ABSTRACT

A ceramic article includes a ceramic matrix composite that has a porous reinforcement structure and a ceramic matrix within pores of the porous reinforcement structure. The ceramic matrix composite includes a surface zone and a glaze material within pores of the surface zone and on an exterior side of the surface zone as an exterior glaze layer.

10 Claims, 4 Drawing Sheets

Related U.S. Application Data continuation-in-part of application No. 13/271,294, filed on Oct. 12, 2011, now Pat. No. 9,533,919.

(51) Int. Cl.

| | | |
|---|---|---|
| *C04B 41/88* | (2006.01) | |
| *C04B 41/85* | (2006.01) | |
| *C04B 35/571* | (2006.01) | |
| *C04B 35/589* | (2006.01) | |
| *C04B 35/626* | (2006.01) | |
| *C04B 35/628* | (2006.01) | |
| *C04B 35/76* | (2006.01) | |
| *C04B 35/80* | (2006.01) | |

(52) U.S. Cl.
CPC ...... *C04B 41/88* (2013.01); *C04B 2235/3891* (2013.01); *C04B 2235/40* (2013.01); *C04B 2235/404* (2013.01); *C04B 2235/408* (2013.01); *C04B 2235/421* (2013.01); *C04B 2235/48* (2013.01); *C04B 2235/483* (2013.01); *C04B 2235/522* (2013.01); *C04B 2235/5244* (2013.01); *C04B 2235/5248* (2013.01); *C04B 2235/5252* (2013.01); *C04B 2235/5268* (2013.01); *C04B 2235/616* (2013.01); *C04B 2235/6584* (2013.01); *C04B 2235/80* (2013.01); *C04B 2235/9607* (2013.01); *Y10T 428/24997* (2015.04); *Y10T 428/249967* (2015.04); *Y10T 428/249969* (2015.04)

(56) References Cited

U.S. PATENT DOCUMENTS

| | | | | |
|---|---|---|---|---|
| 5,441,762 A | * | 8/1995 | Gray | ...... C04B 35/806 427/190 |
| 5,682,594 A | | 10/1997 | Kennedy et al. | |
| 6,110,535 A | | 8/2000 | Rey et al. | |
| 6,228,437 B1 | * | 5/2001 | Schmidt | ...... C04B 41/009 427/243 |
| 6,228,904 B1 | | 5/2001 | Yadav et al. | |
| 6,627,126 B2 | | 9/2003 | Schmidt | |
| 6,635,339 B1 | | 10/2003 | Adler | |
| 6,699,810 B2 | | 3/2004 | Schwab et al. | |
| 6,899,837 B2 | | 5/2005 | Mazany et al. | |
| 7,153,465 B1 | | 12/2006 | Schwab et al. | |
| 7,628,942 B1 | | 12/2009 | Miller et al. | |
| 7,749,568 B2 | | 7/2010 | Schmidt | |
| 2002/0039647 A1 | | 4/2002 | Igashira et al. | |
| 2003/0132558 A1 | | 7/2003 | Schmidt et al. | |
| 2004/0241412 A1 | | 12/2004 | Huener et al. | |
| 2004/0243133 A1 | | 12/2004 | Materna | |
| 2006/0121266 A1 | | 6/2006 | Fandel et al. | |
| 2007/0292690 A1 | | 12/2007 | Schmidt | |
| 2008/0020193 A1 | | 1/2008 | Jang et al. | |
| 2011/0071014 A1 | | 3/2011 | Kmetz et al. | |
| 2011/0148011 A1 | | 6/2011 | Colopy | |
| 2012/0087457 A1 | | 4/2012 | Garnier et al. | |
| 2013/0085057 A1 | | 4/2013 | Schmidt | |

OTHER PUBLICATIONS

European Search Report completed Jan. 28, 2013 for European Patent Application No. 12187629.6.
International Preliminary Report on Patentability for PCT Application No. PCT/US2014/033283 dated Oct. 22, 2015.
Supplementary European Search Report for European Patent Application No. 14782827 completed Oct. 20, 2016.
International Search Report for PCT Application No. PCT/US2012/033283 completed Aug. 8, 2014.
Greil, P. (1995). Active-filler-controlled pyrolysis of preceramic polymers. J. Am. Ceram. Soc. vol. 78(4). pp. 835-848.

* cited by examiner

METHOD FOR FABRICATING A CERAMIC MATERIAL

CROSS-REFERENCE TO RELATED APPLICATION

This application is a divisional of U.S. patent application Ser. No. 13/859,093 filed Apr. 9, 2013, which is a continuation-in-part of co-pending U.S. patent application Ser. No. 13/271,294 filed Oct. 12, 2011.

BACKGROUND

This disclosure relates to ceramic processing. Ceramic materials are known and used for components such as coatings, ceramic bodies and ceramic matrices. Ceramic materials may be fabricated using techniques such as powder processing and sintering, polymer impregnation and pyrolysis, or melt or slurry infiltration. However, these processing techniques can limit the chemistry and microstructure of the ceramic material.

SUMMARY

A ceramic article according to an example of the present disclosure includes a ceramic matrix composite that has a porous reinforcement structure and a ceramic matrix within pores of the porous reinforcement structure. The ceramic matrix composite has a surface zone, and there is a glaze material within pores of the surface zone and on an exterior side of the surface zone as an exterior glaze layer on the ceramic matrix composite.

In a further embodiment of any of the foregoing embodiments, the glaze material is free silicon.

In a further embodiment of any of the foregoing embodiments, the glaze material is a free metal selected from the group consisting of boron, titanium, vanadium, chromium, zirconium, niobium, molybdenum, ruthenium, rhodium, hafnium, tantalum, tungsten, rhenium, osmium, iridium and combinations thereof.

In a further embodiment of any of the foregoing embodiments, the free metal is selected from the group consisting of boron, zirconium, and combinations thereof.

In a further embodiment of any of the foregoing embodiments, the free metal is selected from the group consisting of vanadium, molybdenum, hafnium, tantalum, and combinations thereof.

In a further embodiment of any of the foregoing embodiments, the glaze material contains free silicon and a free metal selected from the group consisting of boron, titanium, vanadium, chromium, zirconium, niobium, molybdenum, ruthenium, rhodium, hafnium, tantalum, tungsten, rhenium, osmium, iridium and combinations thereof.

In a further embodiment of any of the foregoing embodiments, the free metal is selected from the group consisting of boron, zirconium, and combinations thereof.

In a further embodiment of any of the foregoing embodiments, the free metal is selected from the group consisting of vanadium, molybdenum, hafnium, tantalum, and combinations thereof.

In a further embodiment of any of the foregoing embodiments, the glaze material is a ceramic material.

In a further embodiment of any of the foregoing embodiments, the ceramic material is at least partially amorphous.

In a further embodiment of any of the foregoing embodiments, the glaze material is a Borosilicate glass (BSG) of composition, by weight, Boron Oxide, $B_2O_3$, 10-30%; Aluminum Oxide, $Al_2O_3$, 0-4%; Sodium Oxide, $Na_2O$, 0-8%; and Silicon Dioxide, $SiO_2$, 65-85%.

In a further embodiment of any of the foregoing embodiments, the glaze material is a Barium Magnesium Alumino Silicate (BMAS) glass of composition, by weight, Barium Oxide, BaO, 12-16%; Magnesium Oxide, MgO, 5-10%; Boron Oxide, $B_2O_3$, 0-4%; Aluminum Oxide, $Al_2O_3$, 25-35%; and Silicon Dioxide, $SiO_2$, 45-55%.

In a further embodiment of any of the foregoing embodiments, the ceramic matrix composite includes an interior zone under the surface zone, and the interior zone is free of any of the glaze material and has a greater porosity than the surface zone.

In a further embodiment of any of the foregoing embodiments, the glaze material on the exterior side is a solid, continuous layer.

In a further embodiment of any of the foregoing embodiments, the glaze material is a silicate-based glass or a glass-ceramic that includes at least one rare earth metal from La, Ce, Pr, Nd, Pm, Sm, Eu, Gd, Tb, Dy, Ho, Er, Tm, Yb, Lu, Sc, Y, and Hf.

A ceramic article according to an example of the present disclosure includes a ceramic matrix composite that has a porous reinforcement structure and a ceramic matrix within pores of the porous reinforcement structure. The ceramic matrix composite has a surface zone, and there is a glaze material within pores of the surface zone and on an exterior side of the surface zone as an exterior glaze layer on the ceramic matrix composite. The glaze material has free silicon and at least one other free metal.

In a further embodiment of any of the foregoing embodiments, the free metal selected from the group consisting of boron, titanium, vanadium, chromium, zirconium, niobium, molybdenum, ruthenium, rhodium, hafnium, tantalum, tungsten, rhenium, osmium, iridium and combinations thereof.

In a further embodiment of any of the foregoing embodiments, the free metal is selected from the group consisting of boron, zirconium, and combinations thereof.

In a further embodiment of any of the foregoing embodiments, the free metal is selected from the group consisting of vanadium, molybdenum, hafnium, tantalum, and combinations thereof.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
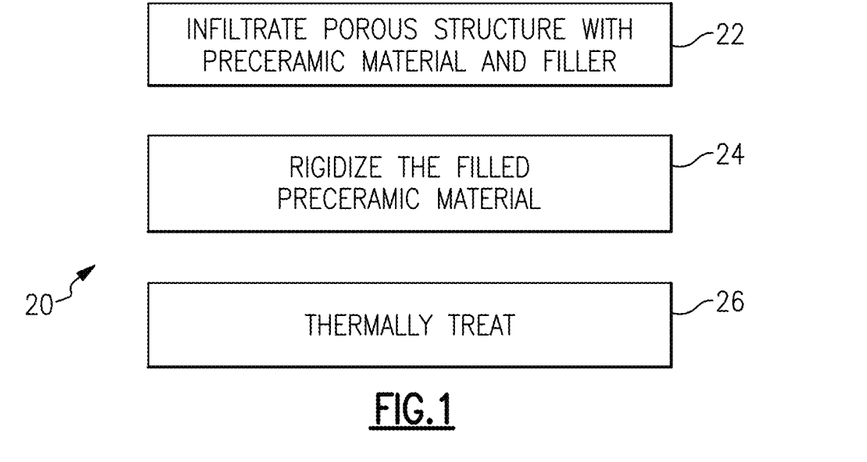
FIG. 1 illustrates a method for fabricating a ceramic material.

FIG. 1 illustrates a method 20 for fabricating a ceramic material. As will be described in further detail below, the method 20 allows fabrication of ceramic materials with new compositions and/or microstructures that are not heretofore available. Furthermore, the method 20 can be used to enhance densification and/or thermal conductivity of ceramic materials for end use components such as turbine engine components.

As illustrated in FIG. 1, the method 20 generally includes steps 22, 24 and 26. Any or all of steps 22, 24 and 26 can be repeated for a desired number of iterations in the method 20 to modify porosity and properties, for example. As shown, at step 22 a mixture is infiltrated into a porous structure. The mixture includes a preceramic material and a filler material. The filler material includes at least one free metal. In this disclosure, a "metal" refers to elements conventionally identified as metals and also to semi-metals or metalloids, such as silicon. A "free metal" refers to a metal or metals that are metallically bonded. In this disclosure, free metals include elemental forms of metals and metal-containing compounds that provide a source of metal, such as through decomposition of an organometallic compound. At step 24, the preceramic material is rigidized, such as by curing, to form a green body. In this disclosure, "rigidized" refers to an increase in the viscosity or molecular weight or resistance to flow of the preceramic material as induced by polymerization, crosslinking, precipitation, curing, condensation or the like. At step 26, the green body is thermally treated to convert the rigidized preceramic material into a ceramic matrix within the pores of the porous structure. The same thermal treatment or a second, further thermal treatment is used to cause the at least one free metal to move into pores of the thermally treated green body. The pores include internal porosity defined by the ceramic matrix as well as pores defined within or at least partially by the porous structure. In one example, the pores range in size from nanometer size to a few hundred micrometers.

The method 20 thus utilizes the infiltration in step 22 to deliver the free metal into the porous structure and the thermal treatment (or subsequent thermal treatment(s)) to infiltrate the free metal into the internal pores of the ceramic matrix as well as pores defined within or at least partially by the porous structure. In one example, the internal pores of the ceramic matrix and/or the pores defined within or at least partially by the porous structure include pores that are not interconnected or surface connected. For example, the internal pores are voids, micro-cracks or other open regions that are formed during the conversion of the preceramic material to ceramic. Infiltrating the free metal into the internal pores of the ceramic matrix and pores defined within or at least partially by the porous structure thereby at least partially fills the pores to enhance the densification of the ceramic material and/or facilitate enhancement of other properties, such as improvement of the thermal conductivity of the ceramic material or to improve the environmental resistance of the ceramic material. Further examples of the method 20 are described below. It is to be understood that the examples disclosed herein may be used individually or in combination with any other example(s).

In one example of step 26, the green body is treated at a temperature that is below the melting temperature of the at least one free metal. The selected thermal treatment temperature, however, is slightly below the melting temperature (e.g., within 10%) of the at least one free metal such that the free metal softens and thereby mobilizes within the ceramic matrix. The mobilized free metal is able to flow and/or diffuse to the internal porosity of the ceramic matrix. The free metal thereby at least partially fills the internal porosity to increase densification of the ceramic matrix and overall ceramic component.

Alternatively, the thermal treatment that converts the preceramic material into the ceramic matrix can be followed by a second, further thermal treatment to mobilize the free metal to move to the internal porosity defined by the ceramic matrix. In one example, the second thermal treatment is conducted at a temperature that is approximately equivalent to the first thermal treatment temperature or, alternatively, at a higher temperature that is above the melting temperature of the free metal. At a temperature exceeding the melting temperature, the free metal liquefies and flows into the internal porosity of the ceramic matrix. In one example based on silicon as the free metal, the silicon expands upon re-solidification and thereby further enhances densification of the final ceramic component.

In embodiments, the porous structure includes or is a fibrous structure having ceramic, metallic and/or carbon fibers. In examples, the ceramic fibers include oxide or non-oxide ceramic fibers. In one example, the fibers are silicon carbide-containing fibers. In a further example, the fibers are coated, prior to the method 20, with a suitable protective coating that serves to chemically protect the fibers and allow for the desired composite mechanical behavior. In embodiments, the protective coating includes an oxide or non-oxide coating and can be a monolayer coating or a multilayer coating.

The preceramic material is a material that converts from a non-ceramic material to a ceramic material. In one example, the preceramic material is a carbosilane-, carbonitride-, silazane-, silane-, or siloxane-based polymer, oligomer or mixture thereof. In one example, the preceramic material is a carbosilane-based material that converts, in the absence of oxygen, to silicon carbide. In another example, the preceramic material is a silazane-based material that converts, in the absence of oxygen, to silicon carbide and silicon nitride. In yet another example, the preceramic material includes heteroatom modifications such as boron, aluminum, zirconium, gadolinium, hafnium or titanium. Given this description, one of ordinary skill in the art will recognize other types of preceramic materials to meet their particular needs.

In one example, the at least one free metal includes silicon. In other examples, additional metals are included with the silicon. In further examples, the free metal or metals are selected from refractory metals, which include boron, titanium, vanadium, chromium, zirconium, niobium, molybdenum, ruthenium, rhodium, hafnium, tantalum, tungsten, rhenium, osmium, iridium and mixtures thereof.

In a further embodiment, the filler within the mixture includes multiple free metals, such as any of those listed in the above examples. The thermal treatment or, alternatively, the second, further thermal treatment not only mobilizes the free metals but also causes the free metals to react together to form a free metal-derived compound within the internal pores of the ceramic matrix. In one example, the free metal-derived compound is molybdenum disilicide ($MoSi_2$) which forms from silicon and molybdenum as the free metals. The filler may range in size from sub-nanometer size to tens or hundreds of micrometers.

In one example, where there is a desire to increase the thermal conductivity of the end use ceramic material, the filler includes the at least one free metal and further includes ceramic particles that have a different thermal conductivity than the ceramic matrix material produced from conversion of the preceramic material. For example, the filler includes the at least one free metal and further includes ceramic particles that have a higher thermal conductivity than the ceramic matrix material produced from conversion of the preceramic material. In one embodiment, the ceramic particles include silicon carbide and the ceramic matrix comprises carbonitride.

In another example, the at least one free metal forms a continuous phase or region within the ceramic matrix. The continuous phase facilitates the enhancement of thermal conductivity of the final ceramic material by providing a continuous thermal conduction path.

Figure 2:
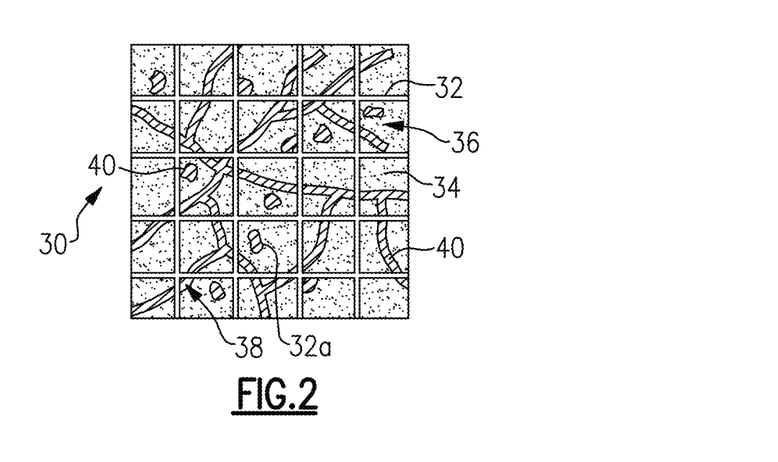
FIG. 2 illustrates an example ceramic component fabricated according to the method of FIG. 1.

FIG. 2 illustrates an example ceramic component 30 fabricated according to the method 20 described above. The ceramic component 30 includes a porous structure 32 and a polymer-derived ceramic matrix 34 within pores 36 of the porous structure 32. In this example, the porous structure 32 is a fibrous structure. The fibrous structure includes two or more parallel sets or tows of fibers that are transversely oriented. In other examples, the fibrous structure is a woven structure, non-woven structure, braided structure, unidirectional fiber lay-up, tape, a two-dimensional structure or three-dimensional structure or other cloth and weave architectures. The fibrous structure can contain continuous, non-continuous or chopped fibers. Given this description, one of ordinary skill in the art will recognize other fibrous structures to meet their particular needs.

The polymer-derived ceramic matrix 34 defines internal pores 38 that result from the conversion of the rigidized material to ceramic during the above-described thermal treatment to form the ceramic matrix 34. In this example, there are also residual pores 32a defined within or at least partially by the porous structure 32. The internal pores 38 are interconnected, non-interconnected, surface connected or non-surface connected. At least one of a free metal or a free metal-derived compound 40 is located within the internal pores 38 of the polymer-derived ceramic matrix 34 and the residual pores 32a. As described above, the free metal can include silicon and/or refractory metals. If multiple free metals are used, the metals may react to form the free metal-derived compound.

In a further example, multiple free metals are used and include at least silicon in combination with one or more of the refractory metals described above. In the thermal treatment or subsequent thermal treatment, the silicon reacts with the one or more of the refractory metals to form a silicide. In embodiments, the silicide includes titanium silicide, chromium silicide, zirconium silicide, hafnium silicide, niobium silicide, tantalum silicide, tungsten silicide, molybdenum silicide or combinations thereof.

In one example, the composition of the ceramic component 30, by volume percentage, is:
  20-70 of the porous structure,
  1-12 of a coating on the porous structure, and
  1-40 of a remainder portion, including the at least one of the free metal and the free-metal derived compound, the preceramic material-derived ceramic matrix and any residual void volume, wherein on a fractional basis 10-100% of the 1-40 volume percent is the free metal and the free-metal derived compound and the balance of the 1-40 volume percent is the preceramic material-derived ceramic matrix and residual void volume, wherein the residual void volume is typically less than 20. In a further example, the residual void volume is less than 5.

In a further example, the above composition of the ceramic component 30 is:
  30-50 of the porous structure,
  2-5 of the coating, and
  2-26 of the remainder portion.

Figure 3:
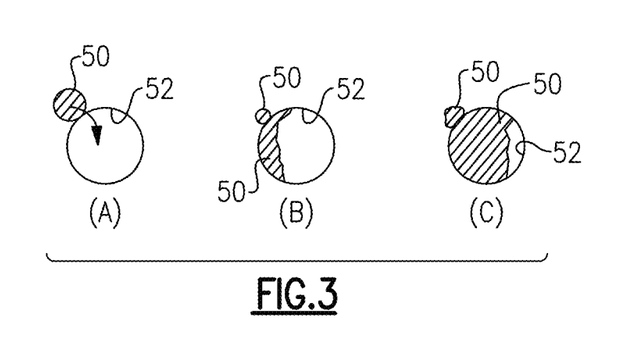
FIG. 3 illustrates an infiltration of a free metal into an internal pore.

FIG. 3 shows the infiltration of a free metal 50 into a pore 52 during thermal treatment in the method 20. The pore 52 may be an internal pore of the preceramic material-derived ceramic matrix 34 or a pore defined within or at least partially by the porous structure 32. This example is based on using silicon as the free metal. In stage (A), the free metal 50 is initially located adjacent the pore 52 at the beginning of the thermal treatment. In stage (B), the thermal treatment mobilizes the free metal 50 such that the free metal can move by flowing, diffusion or both into a portion of the pore 52. In stage (C), upon cooling, the free metal 50 expands within the pore 52 to further fill the pore 52. Thus, the free metal facilitates the densification of the ceramic component 30.

Figure 4:
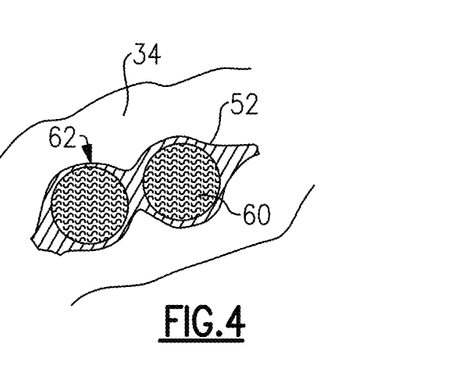
FIG. 4 illustrates an example wherein a ceramic component includes ceramic particles and a free metal or free metal-derived compound that coats the ceramic particles.

FIG. 4 shows another example wherein the preceramic material-derived ceramic matrix 34 includes ceramic particles 60, such as silicon carbide particles. In this example, upon thermal treatment, the free metal 52 migrates and coats the ceramic particles 60 such that there is a continuous region 62 or phase of the free metal or free metal-derived compound that extends through the ceramic matrix 34.

In one example, the ceramic particles 60 are coated with the one or more free metals prior to mixing with the preceramic material in the method 20. During the thermal treatment to mobilize the free metal or metals, the free metal moves through internal pores of the ceramic matrix 34 and interconnects to form the continuous region 62 or phase.

In another example, the ceramic particles 60 are not initially coated with the one or more free metals in the mixture with the preceramic material in the method 20. During the thermal treatment to mobilize the free metal or metals, the free metal moves through internal pores of the ceramic matrix 34, coats the ceramic particles 60 and interconnects to form the continuous region 62 or phase.

In a further example, the selected free metal, or at least one of the free metals, is chemically compatible with the selected ceramic particles 60 such that the free metal or metals have an affinity to the ceramic particles 60. For example, the ceramic particles 60 include, as a constituent element, the same element as the free metal or at least one of the free metals. For instance, the ceramic particles 60 are silicon carbide and the free metal or metals include silicon. In further examples, the ceramic particles 60 are a carbide of the selected free metal or at least one of the selected free metals.

Figure 5:
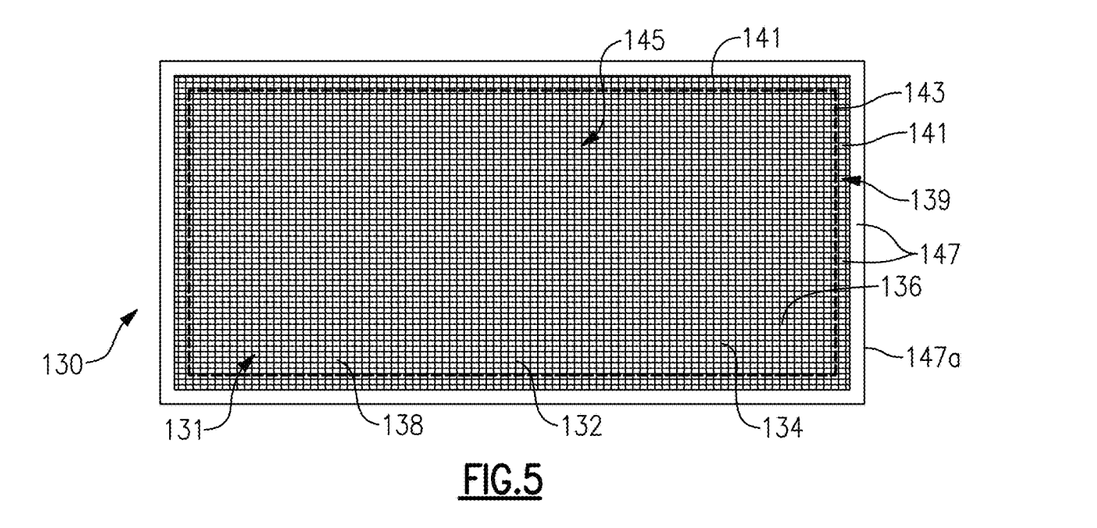
FIG. 5 illustrates an example ceramic article.

FIG. 5 illustrates an example ceramic article 130 that can be fabricated according to the method 20 described above or by using another method that will be described below. In this disclosure, like reference numerals designate like elements where appropriate and reference numerals with the addition of one-hundred or multiples thereof designate modified elements that are understood to incorporate the same features and benefits of the corresponding elements. As can be appreciated, the ceramic article 130 is shown with an indistinct geometry. It is to be understood, however, that the ceramic article 130 can be any end-use article. For instance, the ceramic article 130 can be an article, or portion of an article, of a gas turbine engine, such as but not limited to, combustor liners, turbine blade outer air seals, vanes, and blades.

The ceramic article 130 in this example includes a ceramic matrix composite 131 that has a porous reinforcement structure 132. In this example, the porous reinforcement structure is a continuous fiber reinforcement (generically shown as a grid). The porous reinforcement structure 132 can alternatively be another type of fiber structure, or a non-fibrous structure. The ceramic matrix composite 131 also includes a ceramic matrix 134 within pores 136 (between the grid lines) of the porous reinforcement structure 132. The ceramic matrix 134 can have internal pores 138. The internal pores 138 can be voids, micro-cracks or other open regions.

The ceramic matrix composite 131 includes a surface zone 139 that extends inward from one or more exterior sides 141 of the ceramic matrix composite 131 to a boundary 143 (dashed line) that demarks an interior zone 145. In the illustrated example, the surface zone 139 extends completely around the ceramic matrix composite 131, although in other examples the surface zone 139 may be at only one or selected exterior sides 141 of the ceramic matrix composite 131.

A glaze material 147 is located within pores 136 and/or pores 138 in the surface zone 139 and on one or more of the exterior sides 141 of the surface zone 139 as an exterior glaze layer 147a on the ceramic matrix composite 131. In one example, the interior zone 145 is free of any of the glaze material 145 and thus has a greater porosity than the surface zone 139. The boundary 143 is thus a distinct border between the interior zone that has no glaze material 145 and the surface zone 139 that has the glaze material 145 (i.e., the glaze material 145 indicates the boundary 143).

In this example, the exterior glaze layer 147a is a solid, continuous layer. In other examples, the exterior glaze layer 147a can be discontinuous. Whether the exterior glaze layer 147a is continuous or discontinuous, at least the glaze material 147 in the surface zone 139 seals the pores 136 and/or pores 138 that open to, or are connected to, the exterior sides 141. The glaze material 147 seals the surface zone 139. The glaze material 147 in the surface zone 139 can also modify porosity and properties, such as mechanical properties or thermal conductivity, at the surface zone 139, for example. A continuous exterior glaze layer 147a can provide additional sealing, as well as enhanced aesthetics of the ceramic component 130. For example, the exterior glaze layer 147a can provide a smoother (i.e., lower surface roughness) exterior surface than the exterior sides 141 of the ceramic matrix composite 131.

In further examples, the glaze material 147 is a free metal, but could also include a ceramic material. For example, the free metal is silicon. In other examples, in addition to or instead of silicon, the free metal is selected from refractory metals, which include boron, titanium, vanadium, chromium, zirconium, niobium, molybdenum, ruthenium, rhodium, hafnium, tantalum, tungsten, rhenium, osmium, iridium and mixtures thereof. In another example, the glaze material 147 is a ceramic material, but can also include the free metal or metals from above.

In a further example, the ceramic material is at least partially amorphous, such as a glass material. In a further example, the ceramic material includes a vitreous material. In a further example, the ceramic material is a refractory glass or glass/ceramic composition. In a further embodiment, the glass or glass-ceramic material is silicate-based. For example, the silicate-based glass or glass-ceramic includes boron, barium, calcium, magnesium, lithium, sodium, potassium, aluminum, phosphorus, strontium, zinc, the rare earth metals (La, Ce, Pr, Nd, Pm, Sm, Eu, Gd, Tb, Dy, Ho, Er, Tm, Yb, Lu, including Sc, Y, and Hf), or combinations thereof. In a further example, the silicate-based glass or glass/ceramic additionally includes a nucleating agent that serves to precipitate crystalline phases from the amorphous phase with the application of thermal treatment. In one non-limiting example, the nucleating agent includes zirconium or a compound containing zirconium. A wide variety of glass-ceramic systems exists, e.g., the $Li_2O$ x-$Al_2O_3$ y-$nSiO_2$-System (LAS-System), the MgO x-$Al_2O_3$ y-$nSiO_2$-System (MAS-System), the ZnO x-$Al_2O_3$y-$nSiO_2$-System (ZAS-System), the CaO x-$Al_2O_3$ y-$nSiO_2$-System (CAS), the BaO x-MgO y-$Al_2O_3$ z-$nSiO_2$-System (BMAS-System), the CaO x-MgO y-$Al_2O_3$z-$nSiO_2$-System (CMAS-System), the BaO x-$Al_2O_3$ y-$nSiO_2$-System (BAS-System), the SrO x-$Al_2O_3$ y-$nSiO_2$-System (SAS-System), the REO-x-$Al_2O_3$-$nSiO_2$-Systems (where REO are oxides of the rare earth metals, La, Ce, Pr, Nd, Pm, Sm, Eu, Gd, Tb, Dy, Ho, Er, Tm, Yb, Lu, including Sc, Y, and Hf), and the like, including combinations.

In further examples, the glaze material 147 can be selected based upon the composition of the ceramic matrix composite 131 and use environment of the end-use ceramic article 130. In one example, a Borosilicate glass (BSG) is used as the glaze material 147, with the following oxide compositions, by weight: Boron Oxide, $B_2O_3$, 10-30%; Aluminum Oxide, $Al_2O_3$, 0-4%; Sodium Oxide, $Na_2O$, 0-8%; and Silicon Dioxide, $SiO_2$, 65-85%. In another example, a Barium Magnesium Alumino Silicate (BMAS) glass is used as the glaze material 147, with the following oxide composition ranges by weight: Barium Oxide, BaO, 12-16%; Magnesium Oxide, MgO, 5-10%; Boron Oxide, $B_2O_3$, 0-4%; Aluminum Oxide, $Al_2O_3$, 25-35%; and Silicon Dioxide, $SiO_2$, 45-55%.

Figure 6:
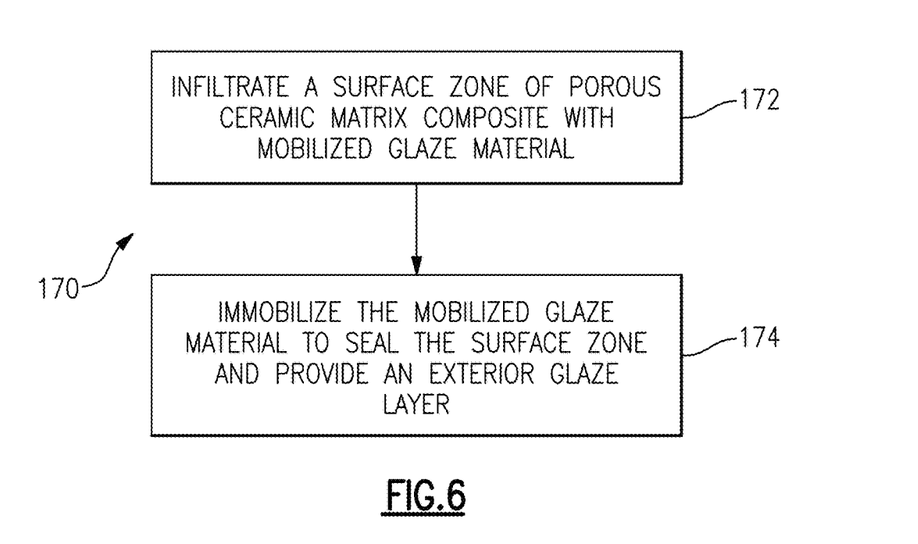
FIG. 6 illustrates an example method for fabricating a ceramic material.

FIG. 6 illustrates a method 170 for fabricating a ceramic material, such as the ceramic article 130. The method 170 will be described with reference to the structure of the ceramic article 130. The method 170 includes an infiltration step 172 and an immobilization step 174. The infiltration step 172 includes infiltrating the surface zone 139 of the porous ceramic matrix composite 131 with a mobilized glaze material 147 such that pores 136 and/or 138 in the surface zone 139, exclusive of the interior zone 145, include the mobilized glaze material 147 and there is a layer of the mobilized glaze material (exterior glaze layer 147a) on the exterior side 141 of the porous ceramic matrix composite 131. The term "mobilized" or variations thereof refers to the ability of the glaze material 147 to infiltrate into the pores 136 and/or 138 under temperatures and/or environment conditions that do not chemically alter the ceramic matrix composite 131. The immobilization step includes immobilizing the mobilized glaze material 147. The immobilized glaze material 147 seals the surface zone 139 and provides the exterior glaze layer 147a on the ceramic matrix composite 131.

In a further example, the glaze material 147 is mobilized thermally, non-thermally, or a combination thereof. The glaze material 147 can be thermally mobilized to a heated melt by thermal melting or softening to a flowable state. The glaze material 147 can be non-thermally mobilized by inclusion of the glaze material 147 in a carrier material. In one example, the carrier material is a preceramic material as described above, but could alternatively be a solvent that is later removed by evaporation.

The infiltration of the infiltration step 172 can first include application of the glaze material 147, mobilized or prior to mobilizing, onto one or more of the exterior sides 141 of the ceramic matrix composite 131. For example, the application can include one or more of spraying the glaze material 147 onto one or more of the exterior sides 141, submerging or partially submerging the ceramic matrix composite 131 in the glaze material 147, or applying a powderized form of the glaze material 147 onto one or more of the exterior sides 141. As can be appreciated, the application is not limited to any particular technique and other techniques can be used.

If not already mobilized, the glaze material 147 can then be mobilized, such as by thermal mobilization. If already mobilized, thermally or non-thermally, the glaze material 147 can then be infiltrated into the surface zone 139. For example, the infiltration can occur from flow of the mobilized glaze material 147 into the pores 136 and/or 138. A low pressure, vacuum environment can be used for assistance. Additionally or alternatively, the infiltration can occur from capillary action in the pores 136 and/or 138.

In a further example, the immobilization step 174 includes immobilizing the glaze material 147 in the pores 136 and/or 138. Whereas the term "mobilized" or variations thereof refers to the ability of the glaze material 147 to infiltrate into the pores 136 and/or 138, the term "immobilized" or variations thereof refers to the inability of the glaze material 147 to exfiltrate from the pores 136 and/or 138. For example, the glaze material 147 can be immobilized by cooling to a lower temperature (for a thermally mobilized glaze material 147) or by conversion or removal of the carrier material (for non-thermally mobilized glaze material 147).

In a further example of the method 170, the infiltration step 172 is part of a polymer infiltration and pyrolysis (PIP) process. For example, the PIP process includes iteratively infiltrating a preceramic polymer material into the porous reinforcement structure 132, curing the infiltrated preceramic polymer material and then pyrolyzing the infiltrated preceramic polymer material. The preceramic polymer material is free of the glaze material 147 in all but the final iteration of the PIP process.

In one further example based on the PIP process, the preceramic polymer material is mixed with a free silicon metal glaze material 147 and infiltrated into the porous reinforcement structure 132 in the final iteration of the PIP process. The infiltrated porous reinforcement structure 132 is then processed at an elevated temperature in an inert environment that is free of oxygen. For example, the elevated temperature can the pyrolysis temperature of the preceramic polymer material and, in one example, can be greater than 1400° C. The free silicon metal melts and further infiltrates into the pores 136 and/or 138. Upon cooling, as indicated above, the silicon expands and thus further enhances densification.

Figure 7:
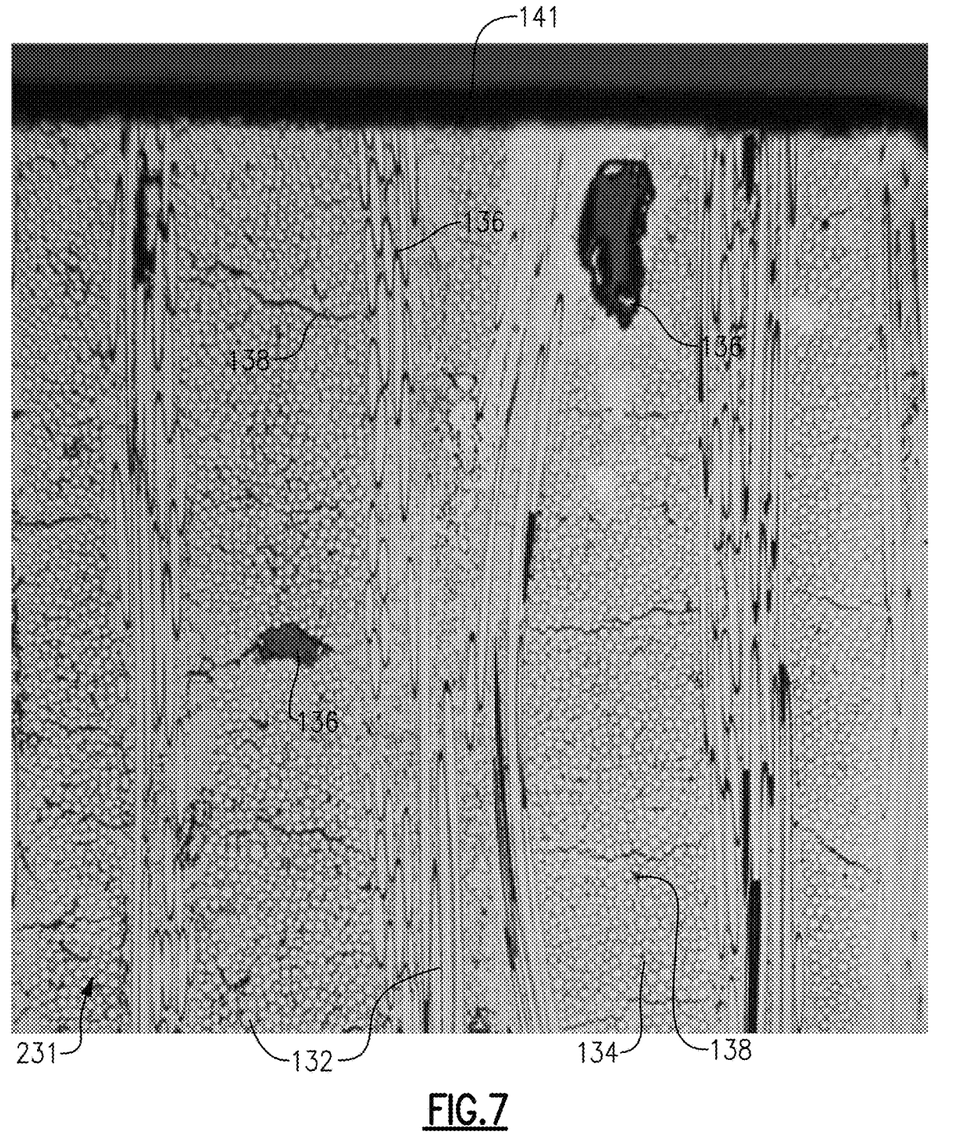
FIG. 7 illustrates a micrograph of a ceramic matrix composite prior to the method of FIG. 6.
Figure 8:
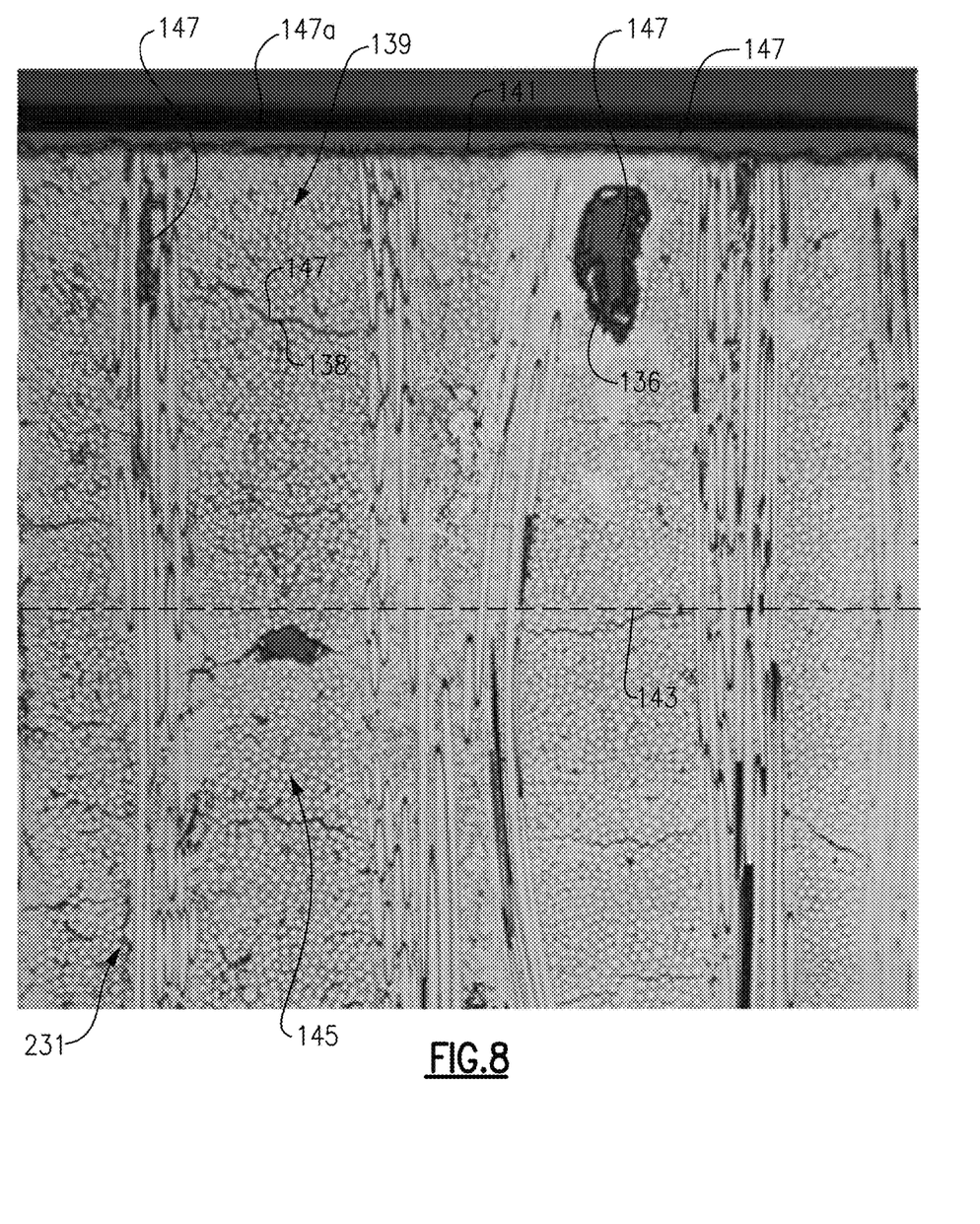
FIG. 8 illustrates a micrograph of the ceramic matrix composite of FIG. 7 after the method of FIG. 6.

FIG. 7 illustrates a micrograph of a ceramic matrix composite 231 prior to the method 170. FIG. 8 illustrates a micrograph of the ceramic matrix composite 231 after the method 170, wherein the glaze material 147 fills many of the pores 136 and/or 138.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A ceramic article comprising:
a ceramic matrix composite including a porous reinforcement structure and a ceramic matrix within pores of the porous reinforcement structure, the ceramic matrix composite including a surface zone; and
a glaze material within pores of the surface zone and on an exterior side of the surface zone as an exterior glaze layer on the ceramic matrix composite, the glaze material containing elemental silicon and elemental metal selected from the group consisting of boron, titanium, vanadium, chromium, zirconium, niobium, molybdenum, ruthenium, rhodium, hafnium, tantalum, tungsten, rhenium, osmium, iridium and combinations thereof, and the ceramic matrix composite including an interior zone under the surface zone, the interior zone being free of any of the glaze material and having a greater porosity than the surface zone, wherein the glaze material excludes ceramic material.

2. The ceramic component as recited in claim 1, wherein the elemental metal is selected from the group consisting of boron, zirconium, and combinations thereof.

3. The ceramic component as recited in claim 1, wherein the elemental metal is selected from the group consisting of vanadium, molybdenum, hafnium, tantalum, and combinations thereof.

4. The ceramic article as recited in claim 1, wherein the glaze material on the exterior side is a solid, continuous layer.

5. The ceramic component as recited in claim 1, wherein free metal is selected from the group consisting of titanium, vanadium, chromium, zirconium, niobium, molybdenum, ruthenium, rhodium, hafnium, tantalum, tungsten, rhenium, osmium, iridium and combinations thereof.

6. The ceramic component as recited in claim 1, wherein free metal is selected from the group consisting of titanium, chromium, hafnium, and combinations thereof.

7. The ceramic component as recited in claim 1, wherein the porous reinforcement structure is a fibrous structure having at least one of ceramic fibers or carbon fibers.

8. A ceramic article comprising:
a ceramic matrix composite including a fibrous reinforcement structure and a ceramic matrix within pores of the fibrous reinforcement structure, the ceramic matrix composite including a surface zone; and
a glaze material within pores of the surface zone and on an exterior side of the surface zone as an exterior glaze layer on the ceramic matrix composite, the glaze material including elemental silicon and an elemental metal selected from the group consisting of boron, titanium, vanadium, chromium, zirconium, niobium, molybdenum, ruthenium, rhodium, hafnium, tantalum, tungsten, rhenium, osmium, iridium and combinations thereof, and the ceramic matrix composite including an interior zone under the surface zone, the interior zone being free of any of the glaze material and having a greater porosity than the surface zone, wherein the glaze material excludes ceramic material.

9. The ceramic component as recited in claim 8, wherein the elemental metal is selected from the group consisting of boron, zirconium, and combinations thereof.

10. The ceramic component as recited in claim 8, wherein the elemental metal is selected from the group consisting of vanadium, molybdenum, hafnium, tantalum, and combinations thereof.

* * * * *